UNITED STATES PATENT OFFICE.

FRIEDRICH RUNKEL, OF ELBERFELD, GERMANY, ASSIGNOR TO THE FARBENFABRIKEN, VORMALS FR. BAYER & CO., OF SAME PLACE.

TRIPHENYLMETHANE DYE.

SPECIFICATION forming part of Letters Patent No. 476,414, dated June 7, 1892.

Application filed December 18, 1891. Serial No. 415,517. (Specimens.) Patented in Germany August 22, 1890, No. 58,483; in England September 16, 1890, No. 14,621, and in France September 19, 1890, No. 208,330.

*To all whom it may concern:*

Be it known that I, FRIEDRICH RUNKEL, doctor of philosophy, chemist, (assignor to the FARBENFABRIKEN, VORMALS FR. BAYER & CO., of Elberfeld,) a subject of the Emperor of Germany, residing at Elberfeld, Germany, have invented a new and useful Improvement in the Manufacture of Coloring-Matters belonging to the Series of the Triphenylmethane Dye-Stuffs, (for which the aforesaid FARBENFABRIKEN has already obtained Letters Patent in the following countries: in Germany, No. 58,483, dated August 22, 1890; in England, No. 14,621, dated September 16, 1890, and in France, No. 208,330, dated September 19, 1890,) of which the following is a specification.

My invention relates to the production of a new valuable triphenylmethane dye-stuff by combining equal molecular proportions of tetramethyldiamidobenzhydrol and salicylic acid in the presence of concentrated sulphuric acid and by subsequently oxidizing the first-produced leuco compound, which corresponds to the formula

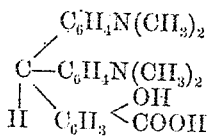

into the dye-stuff by means of oxidizing agents.

The following is a clear and exact description of the process for producing my new coloring-matter:

Twenty kilos, by weight, of tetramethyldiamidobenzhydrol are thoroughly mixed with ten kilos, by weight, of salicylic acid and the obtained mixture is slowly and on stirring introduced into one hundred and twenty kilos, by weight, of concentrated sulphuric acid at 66° Baumé, taking care that the temperature does not rise above 40° centigrade during the whole operation. As soon as the color of the resulting mixture, which is at first yellow, has turned into a light brown the whole mass is poured on one hundred and twenty kilos, by weight, of ice and two hundred kilos of water are mixed therewith. Then soda-lye is added until an almost neutral reaction is obtained. By means of a concentrated watery solution of sodium acetate the leuco compound is precipitated. The precipitated leuco compound, which is formed from one molecule of tetramethyldiamidobenzhydrol and one molecule of salicylic acid, by the withdrawal of the elements of water caused by the action of the concentrated sulphuric acid possesses the following composition:

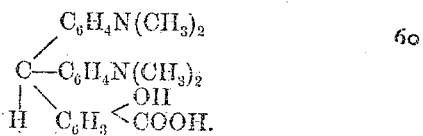

It is filtered off, washed out, pressed, and dried at a temperature not rising above 70° centigrade. 23.4 kilos, by weight, of the last-named leuco compound are dissolved on heating in a mixture of one hundred and twenty kilos, by weight, of an acetic-acid solution containing fifty per cent. of pure acetic acid and twenty-two kilos, by weight, of muriatic acid of 1.15 specific gravity. After the solution has cooled to 10° centigrade, 47.7 kilos, by weight, of a lead dioxide paste containing thirty per cent. of lead dioxide are introduced on stirring. The oxidation immediately takes place and heating is not necessary. By adding a solution of one kilo, by weight, of concentrated sulphuric acid at 66° Baumé in seventy liters of water the lead dissolved is perfectly precipitated in the form of lead sulphate, which after several hours is filtered off. The resulting solution is immediately mixed with continuous stirring, adding ice, with so much dilute soda-lye as is necessary for neutralizing the mineral acids and a part of the acetic acid, the fluid containing still a small quantity of the latter free acid. The dye-stuff formed by the oxidation of the above-mentioned leuco compound, and corresponding to the following formula,

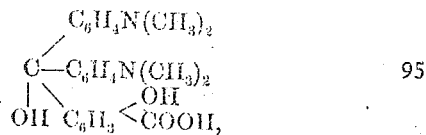

separates as a dark flaky precipitate, which is filtered off, washed out, and employed for dyeing directly as paste. After having been dried and pulverized it forms an olive-colored powder, which difficultly dissolves in water, sodium carbonate, and ammonia liquid, more easily in soda-lye with violet color. When it is mixed with water and dilute hydrochloric acid is gradually added to the liquid, at first a bluish-green, then a reddish-brown color is produced, and the latter reddish-brown liquid, when poured into a great excess of water, again assumes a greenish color. It dissolves in alcohol easily and with reddish-violet color. By concentrated sulphuric acid it is dissolved with brownish-yellow color, which is changed into yellowish red by the addition of ice. When this sulphuric-acid solution is further mixed with a great quantity of water, a light-brown liquid results. Out of its solutions in dilute mineral acids it is again separated by the addition of sodium acetate. When it is treated with reducing agents, it is converted into the above-mentioned leuco compound, which again yields the dye-stuff by oxidation. It is capable of dyeing in acetic-acid baths wool, silk, and cotton when these are previously mordanted with chromium salts, and for printing cotton goods. In the last case a paste containing the coloring-matter mixed with chromium acetate and one of the usual thickenings must be employed. It produces reddish-violet shades perfectly fast to soaping.

Having thus described my invention and in what manner it can be performed, that which I claim as new, and desire to secure by Letters Patent, is—

1. The process of producing a new valuable triphenylmethane dye-stuff by combining in the presence of concentrated sulphuric acid equimolecular proportions of tetramethyldiamidobenzhydrol and salicylic acid and by subsequently oxidizing the resulting leuco compound, substantially as described.

2. The coloring-matter which has the formula,

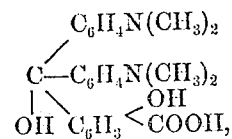

and which in a dried and pulverized state forms an olive-colored powder which difficultly dissolves in water, sodium carbonate, and ammonia liquid with violet color, somewhat more easily in soda-lye with the same color, and when mixed with water and dilute hydrochloric acid is gradually added to the liquid at first a bluish-green, then a reddish-brown color is produced, which when poured into a great excess of water gives a green liquid; also, dissolves easily with reddish-violet color in alcohol, and by concentrated sulphuric acid is dissolved with brownish-yellow color, changing into yellowish red by cooling, and mixing with a great quantity of water assumes a light-brown color; out of dilute-acid solutions it is separated by the addition of sodium acetate, and by reducing agents it is converted into the corresponding leuco compound, which again is oxidizable into the dye-stuff, from which the reddish-violet shades produced are totally fast to soaping.

In testimony whereof I have signed my name in the presence of two subscribing witnesses.

FRIEDRICH RUNKEL

Witnesses:
WM. ESSENWEIN,
RUDOLPH FRICKE.

It is hereby certified that in Letters Patent No. 476,414, granted June 7, 1892, upon the application of Friedrich Runkel, of Elberfeld, Germany, for an improvement in "Triphenylmethane Dyes," an error appears in the printed specification requiring the following correction, viz.: In line 64, page 2, the word "cooling" should be stricken out and the words *the addition of ice* be inserted instead; and that the said Letters Patent should be read with this correction therein that the same may conform to the record of the case in the Patent Office.

Signed, countersigned, and sealed this 28th day of June, A. D. 1892.

[SEAL.]
                                                GEO. CHANDLER,
*First Assistant Secretary of the Interior.*

Countersigned:
    W. E. SIMONDS,
        *Commissioner of Patents.*